(12) United States Patent
Omori et al.

(10) Patent No.: US 11,516,404 B2
(45) Date of Patent: Nov. 29, 2022

(54) CONTROL APPARATUS AND CONTROL METHOD

(71) Applicant: CANON KABUSHIKI KAISHA, Tokyo (JP)

(72) Inventors: Shinya Omori, Tokyo (JP); Yoshikazu Kawai, Tokyo (JP); Yosato Hitaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/176,917

(22) Filed: Feb. 16, 2021

(65) Prior Publication Data

US 2021/0258504 A1 Aug. 19, 2021

(30) Foreign Application Priority Data

Feb. 18, 2020 (JP) .............................. JP2020-025400

(51) Int. Cl.
*H04N 5/232* (2006.01)
*G06F 3/04817* (2022.01)
*H04N 5/272* (2006.01)
*G06F 3/04845* (2022.01)

(52) U.S. Cl.
CPC ... *H04N 5/232945* (2018.08); *G06F 3/04817* (2013.01); *G06F 3/04845* (2013.01); *H04N 5/23203* (2013.01); *H04N 5/232127* (2018.08); *H04N 5/232933* (2018.08); *H04N 5/272* (2013.01); *G06F 2203/04803* (2013.01)

(58) Field of Classification Search
CPC ......... H04N 5/232945; H04N 5/23203; H04N 5/232127; H04N 5/232933; H04N 5/272; H04N 5/23216; H04N 5/247; G06F 3/04817; G06F 3/04845; G06F 3/0485; G06F 2203/04803; G06F 2203/04806
See application file for complete search history.

(56) References Cited

U.S. PATENT DOCUMENTS

| | | | | |
|---|---|---|---|---|
| 2009/0304301 | A1* | 12/2009 | Hattori | H04N 5/232127 382/275 |
| 2010/0020222 | A1* | 1/2010 | Jones | H04N 5/232935 348/E5.022 |
| 2015/0334290 | A1* | 11/2015 | Akaho | G06F 3/04886 348/333.12 |
| 2016/0078583 | A1* | 3/2016 | Nishitani | H04N 5/23229 348/207.1 |
| 2016/0165142 | A1* | 6/2016 | Hada | H04N 5/232935 348/211.1 |
| 2017/0078558 | A1* | 3/2017 | Tamura | G06K 9/6215 |

FOREIGN PATENT DOCUMENTS

JP 2002-196229 A 7/2002

* cited by examiner

*Primary Examiner* — Kelly L Jerabek
(74) *Attorney, Agent, or Firm* — Cowan, Liebowitz & Latman, P.C.

(57) ABSTRACT

A control apparatus includes a receiving unit that receives a captured image obtained by capturing an image in an optical finder of an image capture device in a state in which AF frames are displayed on the optical finder, a display unit that displays the captured image and a UI (user interface) for selecting at least one AF frame from AF frames displayed on the captured image, and a transmitting unit that transmits, to the image capture device, information for specifying the at least one AF frame selected via the UI.

12 Claims, 7 Drawing Sheets

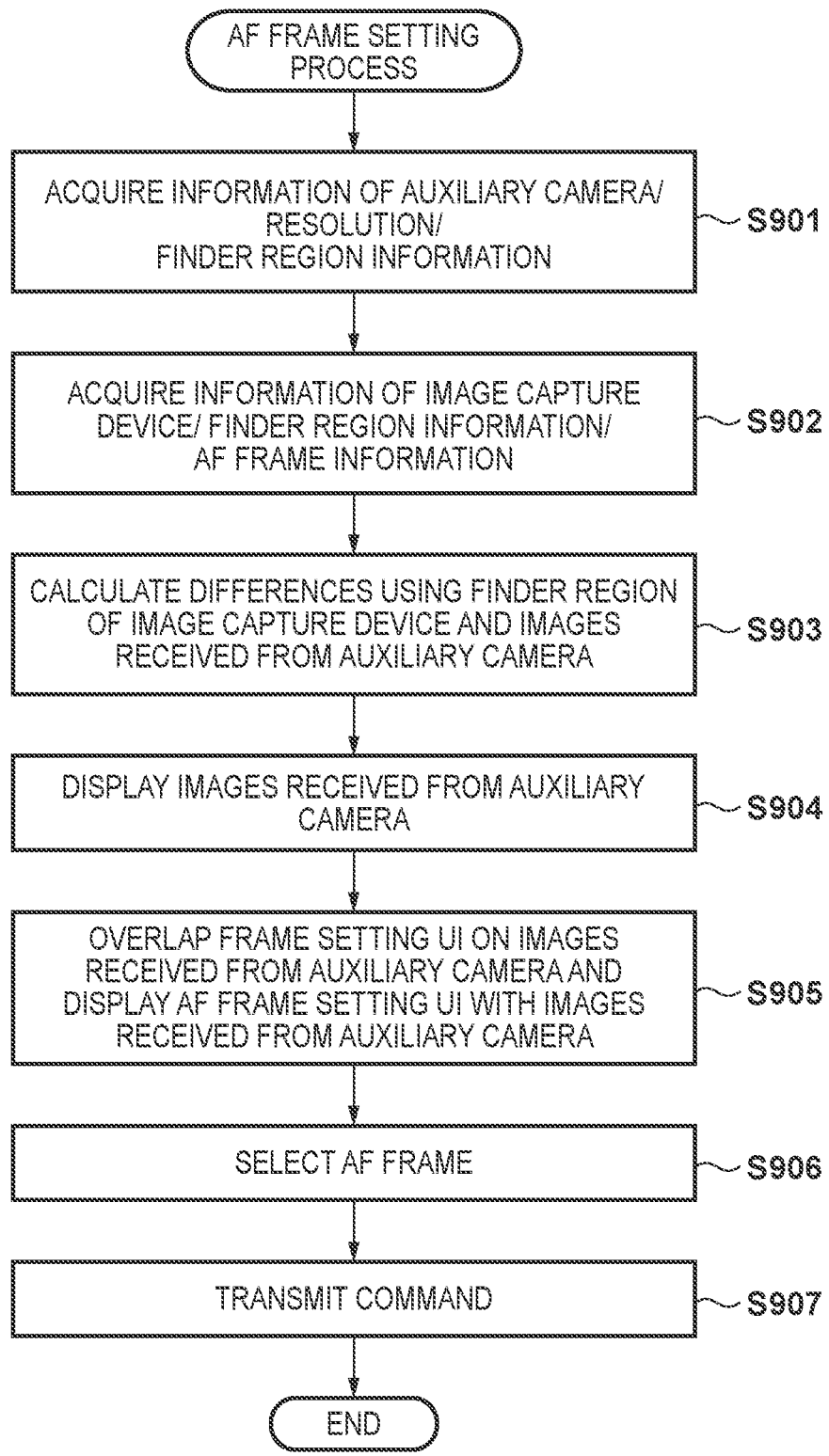

CONTROL APPARATUS AND CONTROL METHOD

BACKGROUND

Field of the Invention

Aspects of the disclosure generally relate to an apparatus, method, and program for controlling an image capture device.

Description of the Related Art

In recent years, there have been remote imaging systems in which image capture devices such as cameras capture images using a wireless or wired communication means through remote operations. A representative example thereof is a remote imaging system for providing higher value-added images by capturing the images from areas where usually, no person is allowed to enter, such as high areas at the sports venues, for example. Also, images can be captured as a result of installing an image capture device mounted on a pan head by which panning, tilting, and rolling can be driven at the venue in advance, and remotely operating the pan head and the image capture device from another area in the venue or the outside of the venue during a competition. Such a remote imaging system includes a control apparatus that can be remotely operated on a network. At this time, a user can not only operate the image capture device connected thereto to capture images but also perform, using the control apparatus, setting operations for controlling the function of the image capture device.

Japanese Patent Laid-Open No. 2002-196229 discloses a camera system in which a display device that is separated from a camera main body is provided with an area setting means for setting the position of a focus area, and the position of the focus area can be set through remote operations.

In the above-described remote imaging system, an imaging operation is performed while monitoring streaming images transmitted from the image capture device, using a remote control apparatus. This streaming images are images acquired by an image sensor of the image capture device. The operation state of the image capture device is referred to as "live view shooting" hereinafter.

On the other hand, the operation state of the image capture device having an optical finder when images are captured using the optical finder is referred to as "optical finder shooting" hereinafter. Many image capture devices having optical finders can select either live view shooting or optical finder shooting.

Usually, the AF operation during live view shooting and the AF operation during optical finder shooting differ in the sensors used for AF control, and the AF operation during the optical finder shooting is superior thereto in terms of the AF speed or the like. Thus, when capturing images of athletes with large motions as subjects, many users want to capture images thereof through optical finder shooting.

For demand for realizing optical finder shooting also during remote shooting, it is possible to construct a remote imaging system in which, the inside of an optical finder of an image capture device is captured by an auxiliary camera, and streaming images transmitted from the auxiliary camera is monitored by a control apparatus.

In this remote imaging system, the settings of the AF operation method and the positions and types of AF frames of the image capture device are changed by remotely operating the control apparatus from a remote area.

SUMMARY

According to an aspect of the embodiments, one or more AF frame of an image capture device can be controlled remotely w % bile viewing an image in an optical finder of the image capture device.

According to an aspect of the embodiments, there is provided a control apparatus including a receiving unit that receives a captured image obtained by capturing an image in an optical finder of an image capture device in a state in which AF frames are displayed on the optical finder; a display unit that displays the captured image and a UI (user interface) for selecting at least one AF frame from AF frames displayed on the captured image; and a transmitting unit that transmits, to the image capture device, information for specifying the at least one AF frame selected via the UI.

According to an aspect of the embodiments, there is provided a method including receiving a captured image obtained by capturing an image in an optical finder of an image capture device in a state in which AF frames are displayed on the optical finder; displaying the captured image and a UI (user interface) for selecting at least one AF frame from AF frames displayed on the captured image; and transmitting, to the image capture device, information for specifying the at least one AF frame selected via the UI.

Further aspects of the embodiments will become apparent from the following embodiments.

BRIEF DESCRIPTION OF THE DRAWINGS

FIG. 9 is a flowchart of an AF frame setting process performed by the control apparatus according to the second embodiment.

DESCRIPTION OF THE EMBODIMENTS

Figure 1:
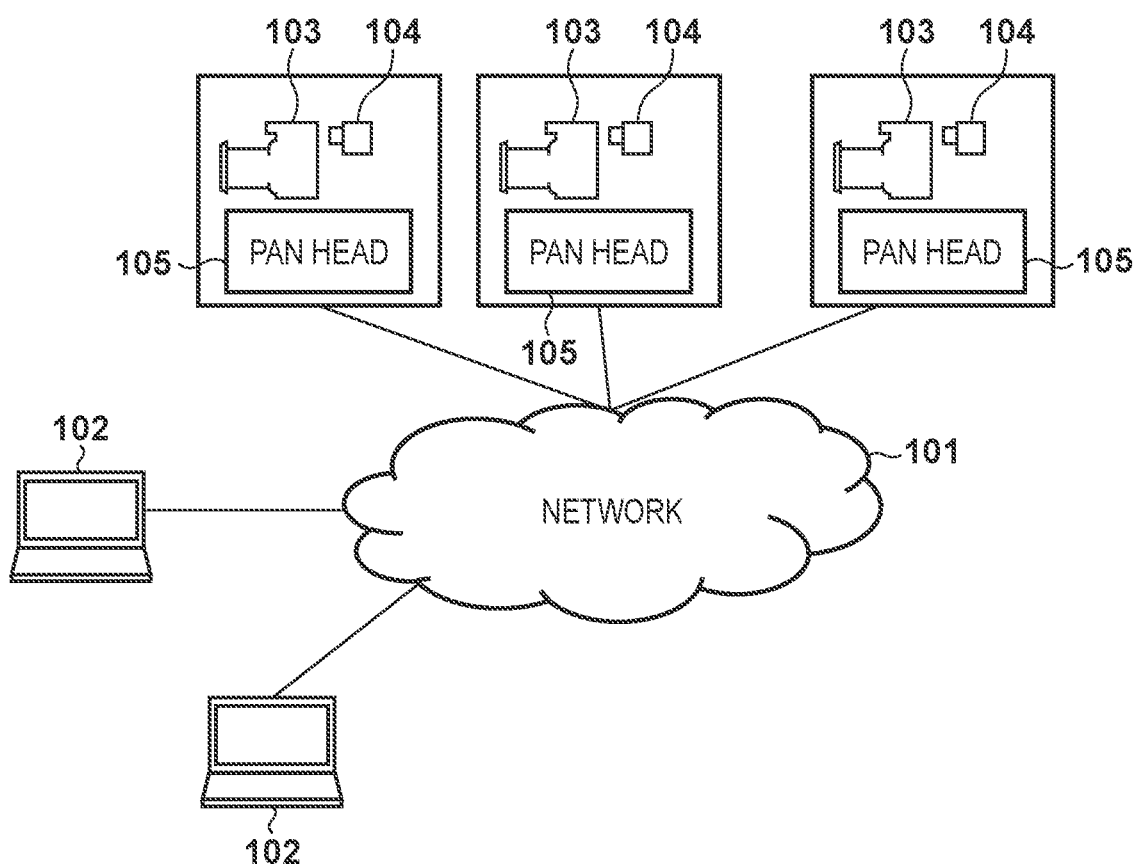
FIG. 1 is a conceptual diagram of an overall system configuration according to a first embodiment.

Exemplary embodiments, features, and aspects of the disclosure will be described below with reference to the drawings. However, aspects of the disclosure are not limited to the following embodiments. Note that, in the drawings, the same reference numerals are given to the same or similar configurations, and redundant description thereof is omitted.

First Embodiment

A first embodiment will be described below with reference to FIGS. 1 to 6. Note that, to facilitate understanding of the description, the overall configuration and operation purposes of a device to which a processing method is applied, the content of a control process, various devices to be controlled, the results of processes, the results of controls, or the like will be specifically described below, and the present invention is no limited thereto. Thus, it is also possible to provide a system in a form in which the configuration, operation purposes of these devices, the content of the control process, parameters used in the control process, various devices to be controlled, or the like can be suitably configured in accordance with the purposes of the overall device, a UI (user interface) that can be set can be provided, or these can be dynamically determined using processing algorithm, programs, or the like.

FIG. 1 is a conceptual diagram of an overall system configuration according to this first embodiment.

This system includes an image capture device 103 that has an optical finder and captures still images or moving images, an auxiliary camera 104 that captures images in the optical finder of the image capture device 103, and a pan head 105 that holds the image capture device 103 and the auxiliary camera 104, and that controls a direction in which the image capture device 103 captures images (pan and tilt operations) and drives the zoom lens of the image capture device 103. Therefore, the auxiliary camera 104 captures images of a subject present in the same line of sight as that of the image capture device 103. Note that, if the image capture device 103 displays (may not in some cases) selectable focus frames on the optical finder in a superimposing manner, the auxiliary camera 104 captures an image of a subject on which the focus frames are superimposed. Also, although it is presumed that the pan head 105 in this embodiment controls the pan, tilt, and zoom, the image capture device 103 may control the zoom out of the pan, tilt, and zoom.

Also, this system includes a control apparatus 102 that communicates with the image capture device 103, the auxiliary camera 104, and the pan head 105, receives and displays images from the image capture device 103 and the auxiliary camera 104, and performs various settings and operations of the image capture device 103 and the pan head 105. Also, this system has a network 101 for mutual communication therebetween. This network 101 may be wired or wireless.

Note that, although an example is illustrated in FIG. 1 in which three sets in which one set includes the image capture device 103, the auxiliary camera 104, and the pan head 105, and two control apparatuses 102 are connected to the network 101, there is no particular limitation thereto.

Figure 2:
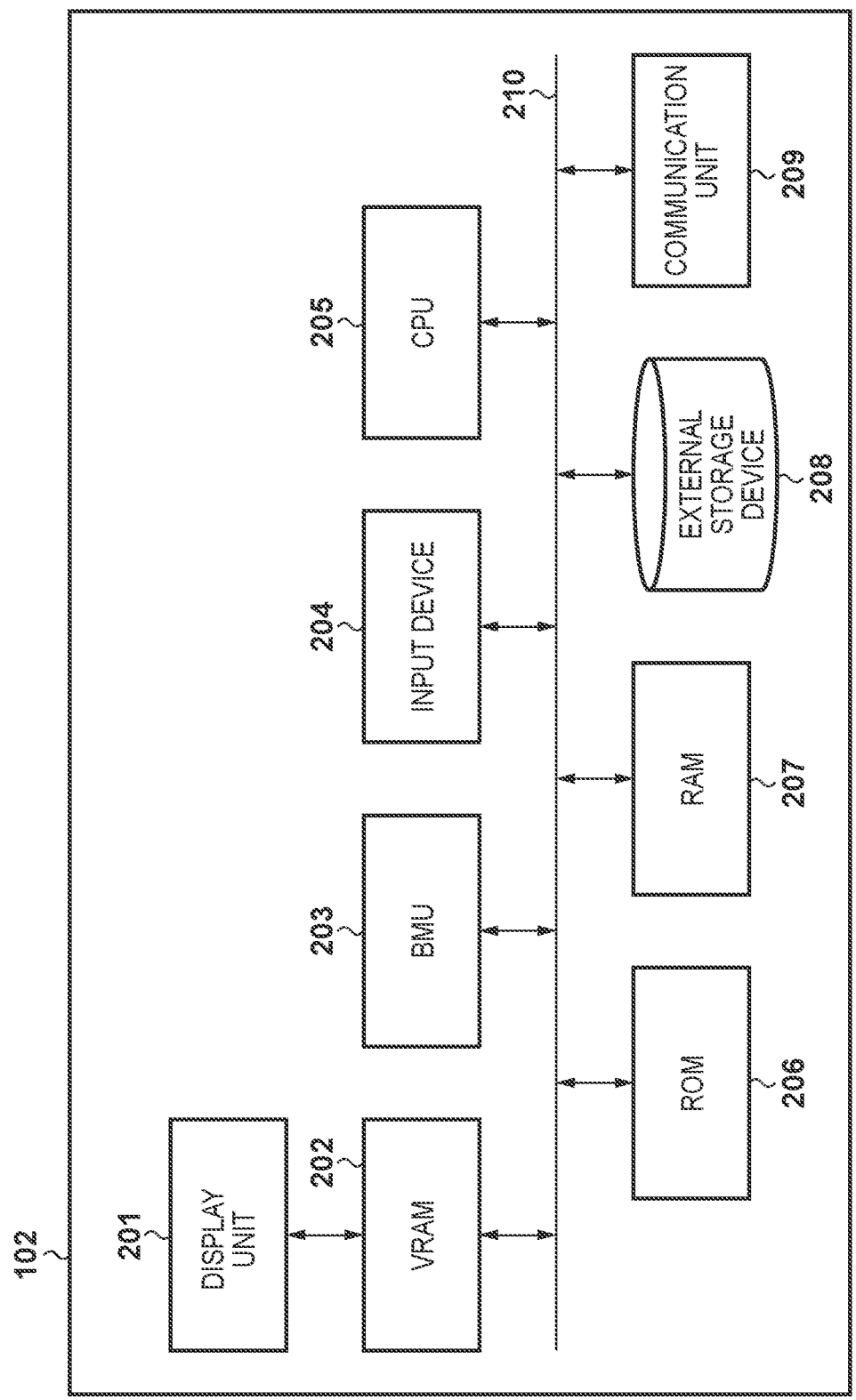
FIG. 2 is a block diagram of a control apparatus according to the first embodiment.

FIG. 2 is a block configuration diagram of the control apparatus 102 in an embodiment. The control apparatus 102 includes a VRAM 202, a BMU 203, an input device 204, a CPU 205, a ROM 206, a RAM 207, an external storage device 208, a communication unit 209, and a bus 210 that connects them. The bus 210 includes an address bus, a data bus, and a control bus. A display device such as an LCD is used for the display unit 201. Images to be displayed on the display unit 201 are rendered in the VRAM 202. Image data generated in the VRAM 202 is transferred to the display unit 201 in accordance with a predetermined rule, and accordingly, images are displayed on the display unit 201. The BMU (bit move unit) 203 controls data transfer between memories (e.g., between the VRAM 202 and another memory), and data transfer between a memory and an I/O device (e.g., the communication unit 209), for example. The input device 204 includes various keys for inputting characters or the like. The CPU 205 controls devices based on control programs stored in the ROM 206 and the external storage device 208. The ROM 206 stores various control programs and data. Specific operation contents and methods in this embodiment will be described later. The RAM 207 includes a work area of the CPU 205, an area for saving data during an error process, an area for loading a control program, or the like. The external storage device 208 stores various control programs to be executed in the control apparatus and various data. The communication unit 209 is an interface for connecting to a network line such as the Internet, and the communication unit 209 communicates with the network 101 in an embodiment.

Figure 3A:
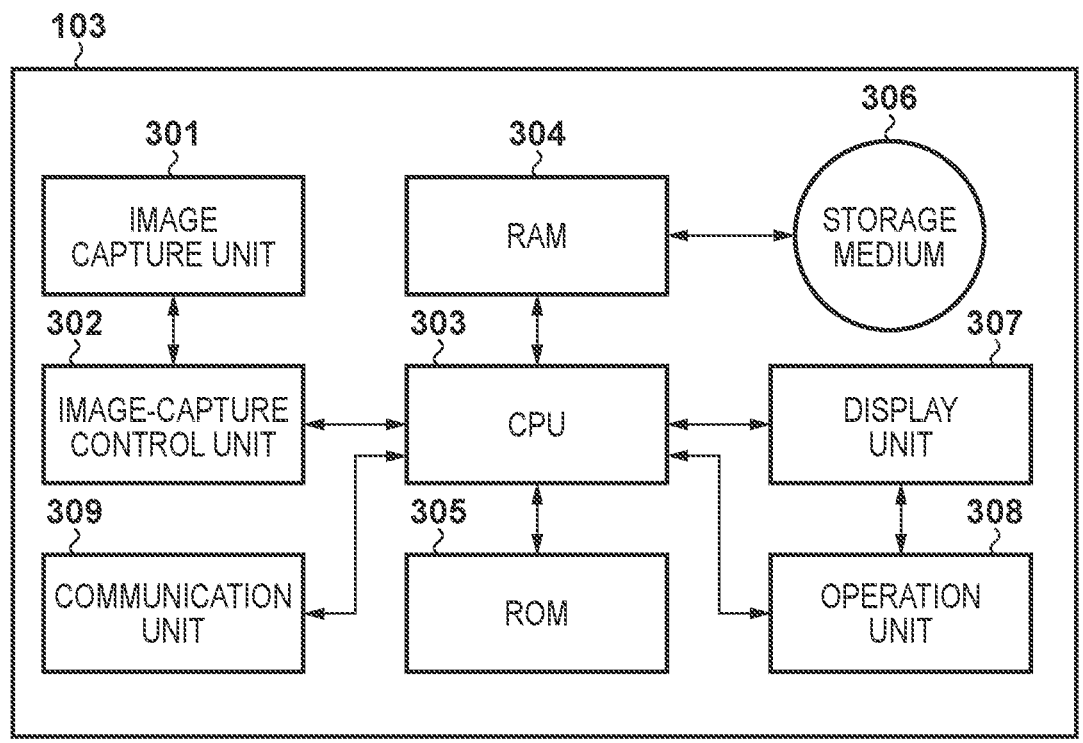
FIG. 3A is a block diagram of an image capture device according to the first embodiment.

FIG. 3A is a block diagram showing the configuration of the image capture device 103 in this embodiment. The image capture device 103 includes a device that captures the images of a subject and obtains image data, such as a digital camera, a digital video camera, or a monitoring camera, and also includes an optical finder. The image capture device 103 is constituted by an image capture unit 301, an image-capture control unit 302, a CPU 303, a RAM 304, a ROM 305, a storage medium 306, a display unit 307, an operation unit 308, and a communication unit 309. The image capture unit 301 includes a lens, a diaphragm, an image sensor, and a signal processing circuit, and generates images. The image-capture control unit 302 controls the image capture unit. The CPU 303 controls various calculations and portions that constitute the image capture device 103 in accordance with an input signal or program. The RAM 304 stores temporary data, and is used for a work area of the CPU 303. The ROM 305 stores a program (firmware) for controlling the image capture device 103, various pieces of setting information, and the product name and serial number of the image capture device 103. The storage medium 306 stores data of captured images or the like. Note that the storage medium 306 can be detached after images are captured, and can be mounted on a personal computer (PC hereinafter) or the like to read data. The display unit 307 displays view finder images at the time of capturing images, captured images, and text for interactive operations, or the like. Note that the image capture device 103 need not include the display unit 307, and the image capture device 103 need only have a display control function for controlling the display performed by the display unit 307. The operation unit 308 is for accepting a user operation. A button, a lever, a touch panel, or the like can be used as the operation unit 308, for example. The communication unit 309 connects to an external device, and transmits and receives a control command and data. The communication unit 309 in an embodiment exchange a notification with the network 101. Specifically, the communication unit 309 is an Ethernet interface, or may be a USB (Universal Serial Bus). Also, the communication unit 309 may be a wireless communication interface such as a wireless LAN.

Note that the image capture unit 301 is provided with a mirror (not shown). A portion of this mirror is translucent, and an optical image that has passed through the translucent portion is supplied to a focus sensor (not shown), and AF is realized. Also, in a state in which the mirror is moved downward, the optical image that has passed through the lens is reflected by the mirror, and an image combined with an image (an image showing a focus frame or the like)

displayed by the display unit 307 using a half mirror or the like is guided to the optical finder. Furthermore, in a state in which the mirror is moved upward, an image that has passed through the lens is supplied to the image sensor of the image capture unit 301, and the image sensor performs focusing and captures images.

The configuration of the image capture device 103 in an embodiment has been described above. Although the auxiliary camera 104 has a structure that is substantially the same as that of the image capture device 103, the auxiliary camera 104 need only have a function for shooting a series of images in the optical finder of the image capture device 103, communicating with the control apparatus 102, and transmitting the series of images thereto.

Figure 3B:
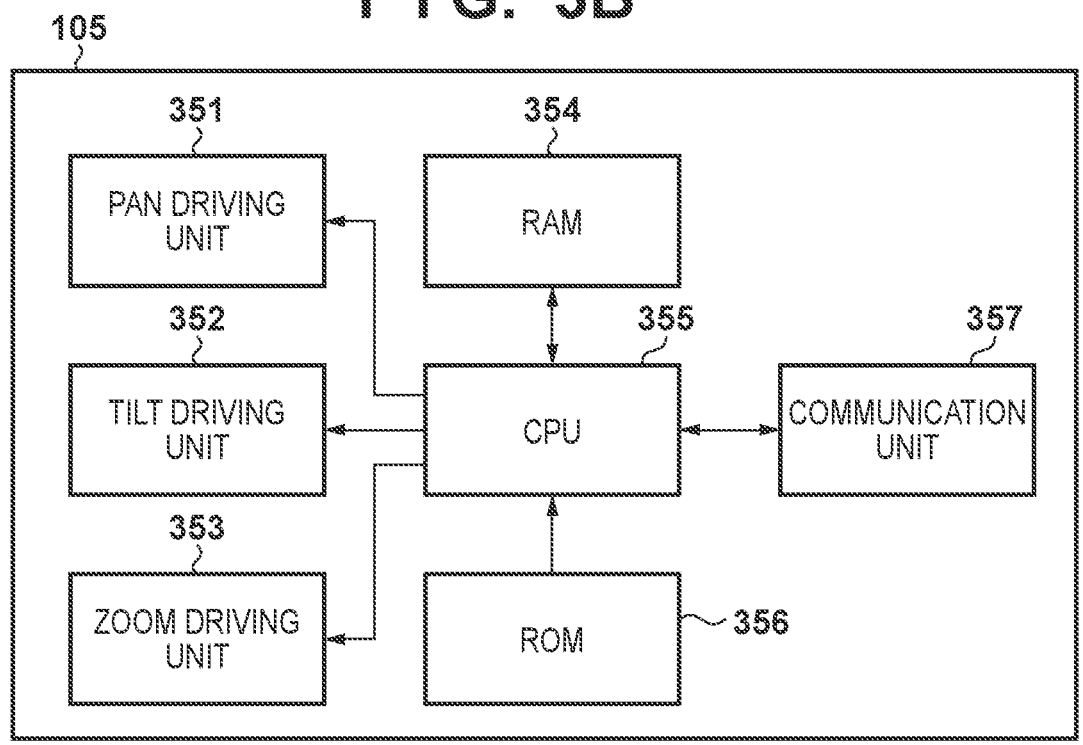
FIG. 3B is a block diagram of a pan head in the first embodiment.

FIG. 3B is a block configuration diagram of the pan head 105 in an embodiment. Note that, although the pan head 105 has a mechanical configuration for holding the image capture device 103 and the auxiliary camera 104, FIG. 3B shows an electrical configuration. The pan head 105 includes a pan driving unit 351, a tilt driving unit 352, a zoom driving unit 353, a RAM 354, a CPU 355, a ROM 356, and a communication unit 357. The communication unit 357 exchanges a notification with the network 101. The CPU 355 executes a program stored in the ROM 356, using the RAM 354 as a work area. Also, in response to a request received from the control apparatus 102, the CPU 355 controls the pan driving unit 351, the tilt driving unit 352, and the zoom driving unit 353 via the communication unit 357 in accordance with this program, and controls the line of sight and zoom of the image capture device 103. Note that zoom may be controlled on the image capture device 103 side.

Figure 4:
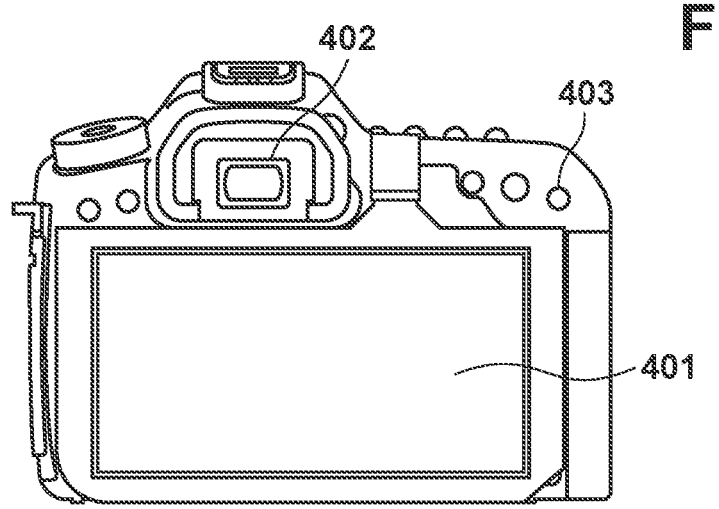
FIG. 4 is a diagram showing the external appearance of a rear portion of the image capture device according to the first embodiment.

FIG. 4 is an external view of the image capture device 103 in an embodiment. Here, an example of a general digital camera is shown. The digital camera includes an external monitor 401, an optical finder 402, an operation button 403, or the like. The auxiliary camera 104 is fixed to the pan head 105 together with the image capture device 103 to stably shoot an image present in the optical finder 402.

Figure 5A:
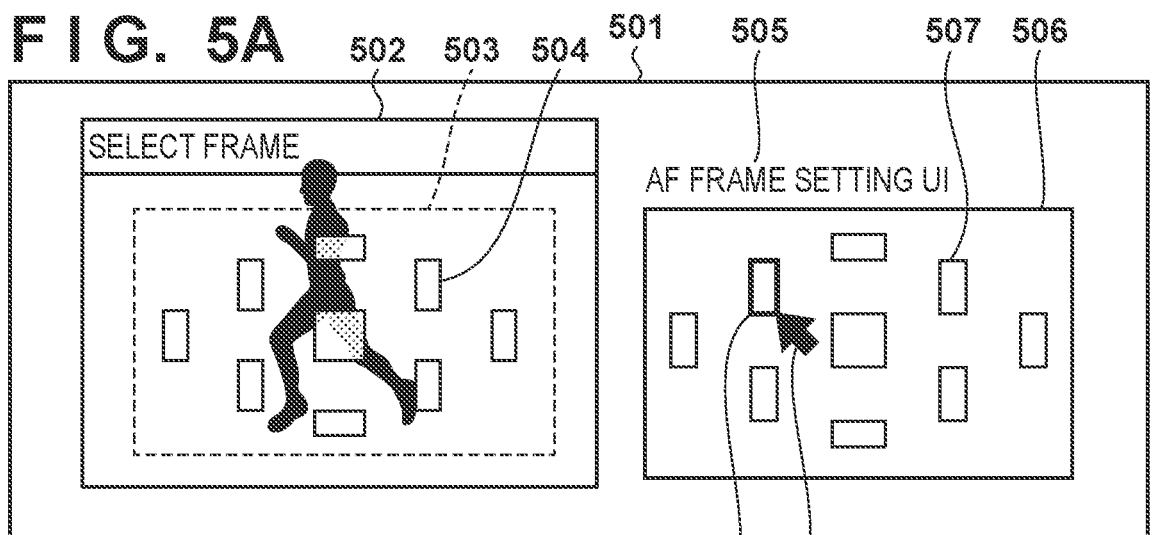
FIGS. 5A and 5B are diagrams showing examples of a screen displayed on a display unit of the control apparatus according to the first embodiment.
Figure 5B:
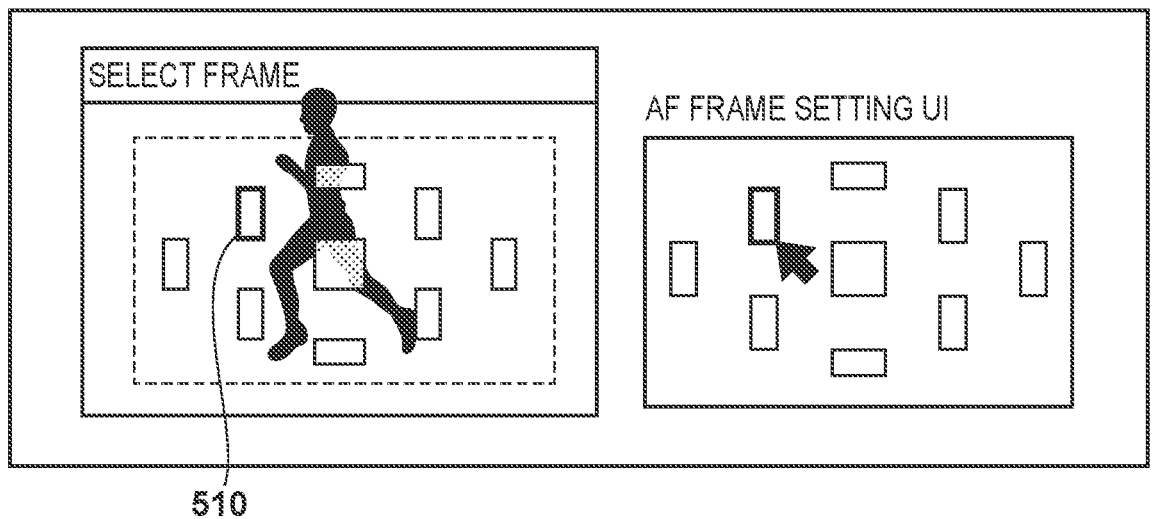

FIGS. 5A and 5B are examples of an operation screen displayed on the display unit 201 when a remote control application is started on the control apparatus 102. When this application is started, the control apparatus 102 transmits various commands set by a user to the image capture device 103 that is currently communicating therewith, the pan head 105, or the like, and thus remote operations can be performed. Note that FIGS. 5A and 5B show the operation screen displayed when the control apparatus 102 transmits a command to instruct one specific image capture device 103 on the network 101 to perform an AF frame selection operation. A configuration may be adopted in which, when receiving the above-described command, the image capture device 103 displays an AF frame selection screen on the display unit 307.

FIG. 5A shows an example of an AF point setting screen of one specific image capture device 103 on the network 101 in the control apparatus 102. When a user inputs an instruction relating to the settings of AF frames in the control apparatus 102, the CPU 205 transmits, to the image capture device 103, a command to transition to the AF point setting. As a result, the CPU 303 in the image capture device 103 displays, on the display unit 307, the AF point setting screen including AF frames, which are selection candidates. Note that, even if the image capture device 103 does not receive a command to transition to the AF point setting, the image capture device 103 can receive a user operation or the like made on the device main body, and the CPU 303 can make the display unit 307 display the AF point setting screen.

An image 502 is an image captured by the auxiliary camera 104. That is, the image 502 is an image obtained as a result of the auxiliary camera 104 capturing an image of the optical finder of the image capture device 103 as a live view video. Reference numeral 503 indicates an area AF frame, and reference numeral 504 indicates an AF frame, and these are seen as being superimposed by a half mirror in the optical finder when setting an AF frame using the UI displayed by the image capture device 103. The area AF frame 503 and the AF frames 504 are configured such that a predetermined number of AF frames 504 whose positions and sizes are predetermined by an AF method are displayed in the area AF frame 503 in a predetermined arrangement. The AF frames 504 are displayed in the optical finder of the image capture device 103 such that it is possible to select which point is set as the AF point. FIG. 5A shows a state in which nine selectable AF frames 504 are displayed in the area AF frame 503. Note that the image 502 is an image just captured by the auxiliary camera 104, and thus, a user cannot directly select the AF frames 504 present in the image. This selection is made through an AF frame setting UI 505, which will be described below.

Reference numeral 505 indicates the AF frame setting UI, and the UI rendered by the control apparatus when setting the AF frames. In the drawing, the AF frame setting UI505 includes an area AF frame 506, and nine AF frames that include an AF frame 507. Information regarding the rendering of the AF frame setting UI 505 is prestored in the external storage device 208, and the CPU 205 performs rendering based on the information. Note that not all of the image capture devices 103 are of the same model, and not all of the auxiliary cameras 104 are of the same model. In view of this, it is presumed that specification information for each model of the image capture device (information relating to the number and arrangement of AF frames, or the like) is stored in the external storage device 208. Also, when the control apparatus 102 starts communication with the image capture device 103 or the auxiliary camera 104, the control apparatus 102 requests information for specifying the models thereof, acquires the corresponding information from the external storage device 208 based on the information received due to the request, and performs a process relating to the AF point setting.

Now, suppose that a user designates an AF frame 509 in the AF frame setting UI 505 using a cursor 508 that moves together with a pointing device (not shown), for example. In this case, the CPU 205 highlights the AF frame 509 (renders the frame with a bold line in the drawing) to notify a user that the AF frame 509 is selected, for example. Then, the CPU 205 generates a command to select the AF point including information for specifying the AF frame 509, and transmits the command to the image capture device 103. Note that, although an example in which the cursor 508 is used to select a target AF frame is described here, any designated icon that moves together with the pointing device can be used, and there is no limitation on the shape and type thereof.

As a result, as shown in FIG. 5B, the CPU 303 in the image capture device 103 highlights that the corresponding AF frame 510 has been selected. The auxiliary camera 104 captures an image thereof, and transmits the image to the control apparatus 102. Also, the CPU 303 performs an AF process with the AF frame 510 used as the AF point hereinafter.

Next, an AF frame setting process, which is a portion of the remote control application executed by the CPU 205 of the control apparatus 102 in an embodiment will be described below with reference to the flowchart of FIG. 7. Note that it is presumed that a program relating to this application is stored in the ROM 206. However, a program may be prestored in the external storage device 208, and the CPU 205 may load the program into the RAM 207 and execute the program.

In step S701, the CPU 205 acquires information regarding the model from the image capture device 103 that is currently communicating therewith, and acquires corresponding specification information from the external storage device 208 based on the acquired information. Then, the CPU 205 displays, on the display unit 201, the AF frame setting UI screen 505 (including the area AF frame 506 and the AF frames) based on information regarding the number and arrangement of AF frames in the acquired specification information.

Then, in step S702, the CPU 205 starts a process for receiving images from the auxiliary camera 104 via the communication unit 209, and starts to display the received images as the image 502.

Then, in step S703, the CPU 205 waits until the user selects one AF frame in the area AF frame 506. When the CPU 205 detects that selection was made, in step S704, the CPU 205 generates a command to select the AF point including information for specifying the selected AF frame, and transmits the command to the image capture device 103 that is currently communicating therewith.

As described above, according to this embodiment, the image in the optical finder of the image capture device 103 captured by the auxiliary camera is displayed, and the AF frame setting UI 505 imitating the AF frame setting screen displayed in the optical finder of the image capture device 103 is displayed. As a result, the user can remotely designate which portion of a subject (present in the images captured by the auxiliary camera) seen through the optical finder of the image capture device 103 is to be aligned with the AF frame. Note that, when the control apparatus 102 ends the AF setting operation, the AF frame setting screen or the like are not displayed. In this case, the auxiliary camera 104 captures images of a subject through the optical finder of the image capture device 103. That is, the auxiliary camera 104 captures images of a subject with the zoom magnification and AF process adjusted by the image capture device 103.

In the case of FIGS. 5A and 5B, the area AF frame 503 in the image 502 captured by the auxiliary camera 104 and the area AF frame 506 in the AF frame setting UI 505 are displayed side-by-side horizontally, and the AF frames included therein are displayed in a one-to-one relationship, and thus the user can know that the AF frame is normally set in the image capture device 103 because the AF frame 510 corresponding to the AF frame 509 designated by the user is highlighted.

Note that the control apparatus 102 displays the captured images acquired from the auxiliary camera 104 on the left side of the screen, and displays the generated area AF frame 506 on the right side of the screen. That is, the user performs an operation for selecting an AF frame in the area AF frame 506 located on the right side of the screen while checking a subject present in images transmitted from the auxiliary camera 104 located on the left side of the screen, and thus the user needs to move the line of sight horizontally.

Figure 6A:
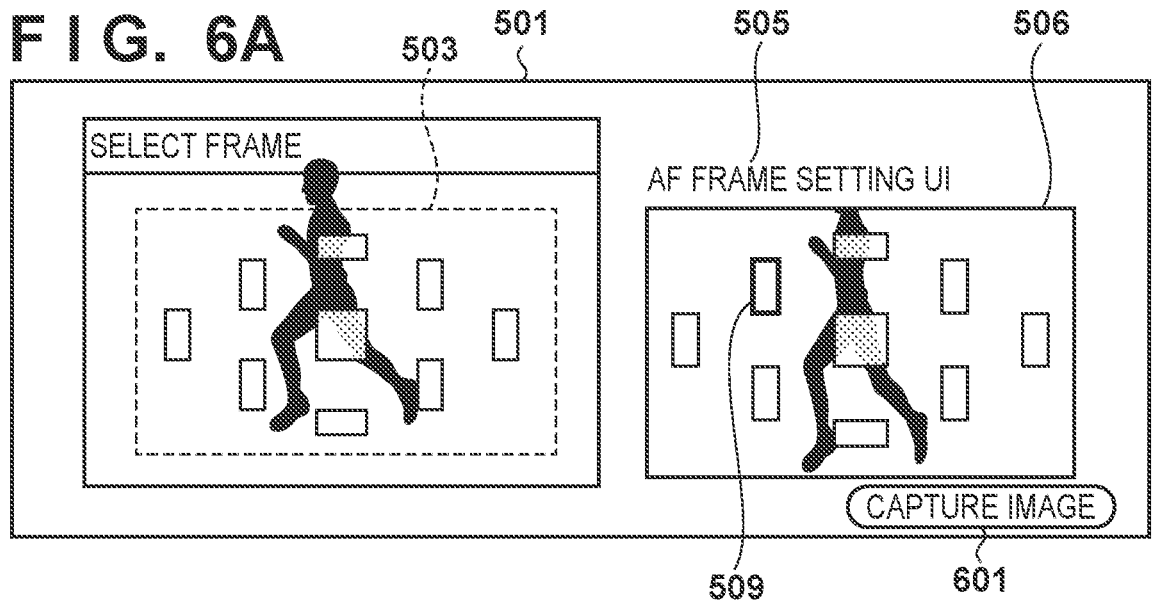
FIGS. 6A and 6B are diagrams showing examples of screens displayed on the display unit of the control apparatus according to the first embodiment.

In view of this, as shown in FIG. 6A, when the user selects an image capture button 601 using the cursor that moves together with the pointing device, the CPU 205 may cut out images present in the area AF frame 503 from the images acquired from the auxiliary camera 104, and display the cutout images superimposed on the area AF frame 506 located on the right side. In this case, the user can perform an operation for designating an AF frame while checking a subject simply by looking at the area AF frame 506.

Figure 6B:
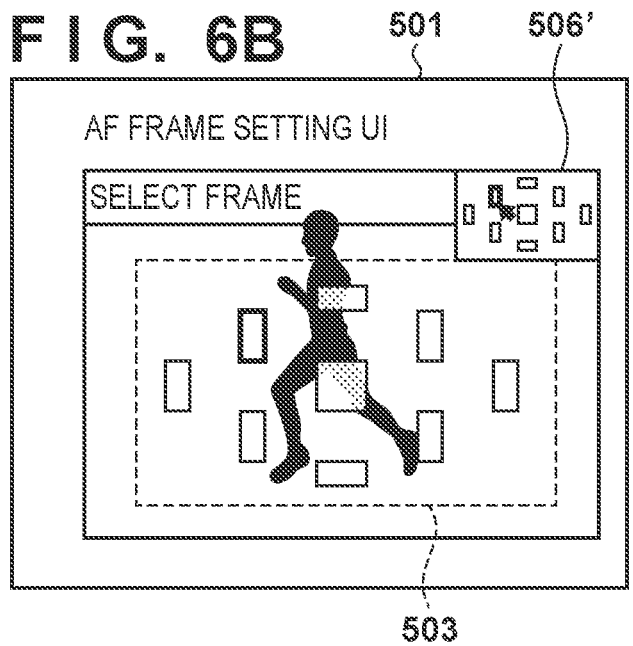

Also, as shown in FIG. 6B, a reduced version 506' of the area AF frame 506 is generated, and the reduced version is combined with the image acquired from the auxiliary camera 104 and is displayed at a position of the image where the reduced version and the area AF frame 503 do not overlap each other, that is, PinP (Picture in Picture) is displayed. In this case, the user can also reduce the amount of movement of the line of sight, compared to FIGS. 5A and 5B.

Also, the area AF frame 506 in the AF frame setting UI 505 is displayed intimating the area AF frame 503 in the images captured by the auxiliary camera 104. Therefore, it is desired that, as shown in FIG. 5(A), the area AF frames 503 and 506 have the same size, and are displayed at the same height (at the same position in the vertical direction) on the screen. In this case, it will be preferable to perform the following processes immediately before step S701 shown in FIG. 7.

First, the CPU 205 is configured to acquire information for specifying the model of a device when the CPU 205 communicates with the image capture device 103 and the auxiliary camera 104, such as the device name. The CPU 205 then specifies and acquires specification information regarding the corresponding image capture device 103 and auxiliary camera 104 in the external storage device 208, using the acquired information as a key. The acquired information need only be information serving as an index for determining the size and position of the area AF frame 506 to be generated, such as the sizes in the horizontal and vertical directions indicating a region, which serves as an index for the optical finder of the image capture device 103, and the resolution of the images captured by the auxiliary camera 104 (the number of pixels in the horizontal and vertical directions), for example. Then, the CPU 205 detects the region of the optical finder present in the images from the auxiliary camera 104, and determines the position and size of the area AF frame 503. The CPU 205 generates the AF frame setting UI 505 that includes the area AF frame 506 having the same size and shape as the area AF frame 503 based on these pieces of information.

Figure 7:
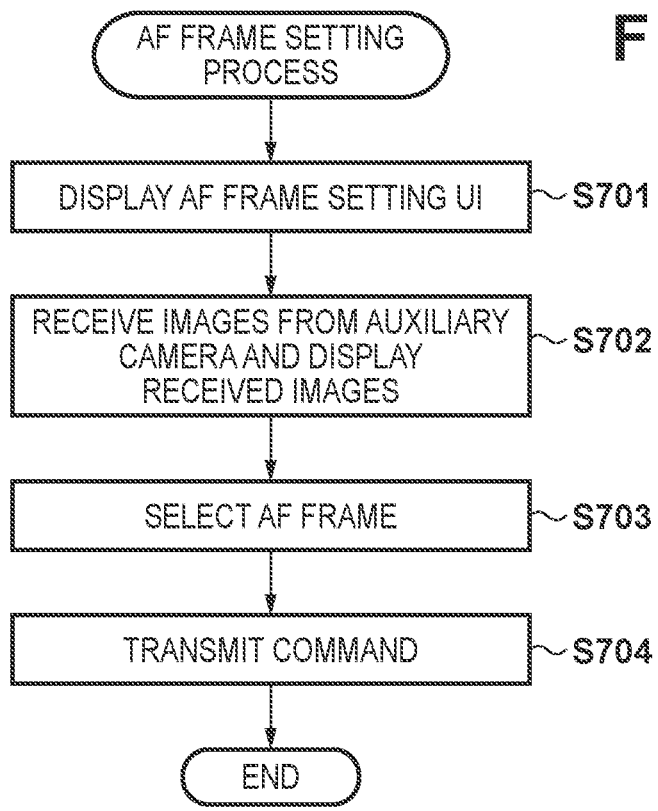
FIG. 7 is a flowchart of an AF frame setting process performed by the control apparatus according to the first embodiment.

In step S701 shown in FIG. 7, the CPU 205 need only display the AF frame UI 505 generated in the above-described manner at a right position of the screen corresponding to the detected AF frame 503. The subsequent process will not need to be described.

As a result of the above, when viewed from the user, the area AF frame 503 and the area AF frame 505 having the same size as the area AF frame 503 present in the images captured by the auxiliary camera 104 are displayed side-by-side, and thus the user can easily recognize that the AF frames therein correspond to each other, and it is possible to provide an environment with good operability.

Second Embodiment

In a second embodiment, the area AF frame 506 is displayed on images captured by the auxiliary camera 104 in a superimposing manner. An example will be described as the second embodiment in which a user can then directly designate an AF frame as if the AF frame was present on the images captured by the auxiliary camera 104.

The point to be considered here is that, when the image capture device 103 and the auxiliary camera 104 are fixed to the pan head 105, the auxiliary camera 104 may be fixed thereto at a position shifting from a target position. Alternatively, although the image capture device 103 and the auxiliary camera 104 are initially correctly fixed to the pan head 105, the positions of the image capture device 103 and the auxiliary camera 104 on the pan head 105 may shift from the original positions due to some kind of external force being applied thereafter. In such a situation, if the area AF frame 506 generated by the CPU 205 is displayed on the images captured by the auxiliary camera 104 in a superimposing manner, the area AF frame 503 and the area AF frame 506 are displayed at positions shifting therefrom. That is, an AF frame group in the area AF frame 503 and an AF frame group in the area AF frame 506 are displayed in a shifted state, resulting in user confusion. Therefore, in the second embodiment, an example will be described in which, even if the position of the auxiliary camera 104 relative to the position of the image capture device 103 shifts from the original position, the shifting is cancelled, and the area AF frame 503 and the AF frame group thereof are accurately matched to the area AF frame 506 and the AF frame group thereof, and they are displayed in a superimposing manner.

Thus, it is presumed that specification information for each model of the auxiliary cameras 104 (such as the number of pixels in the vertical and horizontal directions of the captured image) is also stored in the external storage device 208 in the second embodiment. The configurations of the control apparatus 102 and the image capture device 103 are the same as those in the first embodiment. Hereinafter, an AF frame setting process, which is a portion of the remote control application to be executed by the CPU 205 of the control apparatus 102 in the second embodiment will be described with reference to the flowchart of FIG. 9. Note that it is presumed that, prior to this process, the CPU 205 has already acquired information for specifying the models of the image capture device 103 and the auxiliary camera 104 that are currently communicating therewith, from the image capture device 103 and the auxiliary camera 104.

Figure 8:
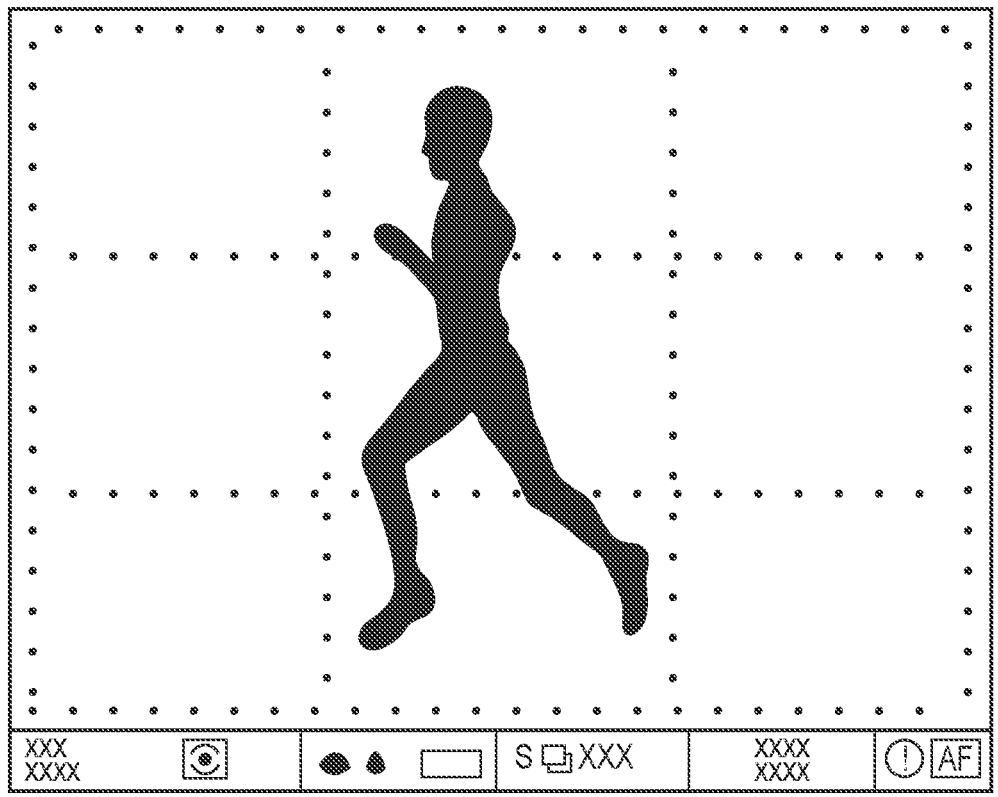
FIG. 8 is a diagram showing an example of a screen displayed on a display unit of a control apparatus according to a second embodiment.

First, in step S901, the CPU 205 acquires information regarding the auxiliary camera 104 from the external storage device 208 based on the model information. The acquired information includes the resolution of images captured by the auxiliary camera 104 (the number of pixels in the horizontal and vertical directions), a finder region of the image capture device 103 in the image 502 (the number of pixels in the vertical and horizontal directions), or the like. The finder region of the image capture device 103 may be acquired through image analysis of images displayed in a dividing grid on the finder of the image capture device 103, for example. FIG. 8 shows an example of the image screen 502 displayed in a dividing grid on the finder of the image capture device 103.

Then, in step S902, the CPU 205 acquires, from the external storage device 208, the finder region of the image capture device 103 and AF frame information (the positions and sizes of the area AF frame 503 and the AF frame 504).

Then, in step S903, based on differences in the position and size between the finder region of the image capture device 103 and the finder region of the image capture device 103 present in the image screen 502 of the auxiliary camera 104, the CPU 205 calculates a difference (the shift amount) between the finder regions, and generates an area AF frame 506 having the same shape and the same size as the area AF frame 503 in the images of the auxiliary camera 104.

Then, in step S904, the CPU 205 starts to receive the images from the auxiliary camera 104 and display the received images. Also, in step S905, the CPU 205 displays the generated area AF frame 506 to overlap the area AF frame 503 while the auxiliary camera 104 is capturing the images. As a result, the area AF frame 503, and all the AF frames in the area AF frame 506 overlap each other.

Note that because the area AF frame 506 having the same shape and the same size as the area AF frame 503 to be displayed in images are generated according to the images from the auxiliary camera 104 in the second embodiment, the area AF frame 503 may not be displayed on the image capture device 103.

In the next step S906, the CPU 205 waits until the user selects one AF frame in the area AF frame 506. When the CPU 205 detects that selection was made, the CPU 205 proceeds to step S907, generates a command to select the AF point including information for specifying the selected AF frame, and transmits the command to the image capture device 103 that is currently communicating therewith.

As a result of the above, according to the second embodiment, it is possible to present a user with an operation environment equivalent to as if the user directly selected an AF frame of the image capture device via the images captured by the auxiliary camera 104.

While aspects of the disclosure are described with reference to exemplary embodiments, it is to be understood that the aspects of the disclosure are not limited to the exemplary embodiments. The scope of the following claims is to be accorded the broadest interpretation so as to encompass all such modifications and equivalent structures.

This application claims the benefit of Japanese Patent Application No. 2020-025400, filed Feb. 18, 2020, which is hereby incorporated by reference herein in its entirety.

What is claimed is:

1. A control apparatus comprising:
    a communication interface that communicates with a camera system including a main camera and a sub camera, where the main camera has an optical finder in which a plurality of AF frames are superimposed on a scene and the sub camera captures an image displayed in the optical finder of the main camera;
    a receiving unit that receives, from the camera system via the communication interface, an image captured by the sub camera of the camera system, where the received image includes the plurality of AF frames;
    a display unit that displays the received image and a UI (user interface) for selecting at least one AF frame from the plurality of AF frames which are superimposed on the scene within the optical finder of the main camera; and
    a transmitting unit that transmits, to the camera system via the communication interface, information for specifying the at least one AF frame selected via the UI so that the main camera of the camera system selects corresponding at least one AF frame among the plurality of AF frames;
    wherein the receiving unit, display unit, and the transmitting unit are implemented by a the one or more processor.

2. The control apparatus according to claim 1, further comprising:
    a computer memory that stores information relating to the AF frames to be superimposed on the scene within the optical finder of the main camera of the camera system; and
    a control unit that generates the UI based on information relating to the AF frames,
    wherein the control unit is implemented by a one or more processor.

3. The control apparatus according to claim 2, wherein the control unit requests, to the camera system, information for specifying the model of the main camera in a case where the control unit starts communication with the camera system.

4. The control apparatus according to claim 2, wherein the information relating to the AF frame includes information relating to the number and arrangement of AF frames.

5. The control apparatus according to claim 4, wherein the control unit is configured to generate the UI in correspondence with the number and arrangement of AF frames displayed with the captured image.

6. The control apparatus according to claim 1, further comprising:
a pointing device,
wherein the display unit is configured to display an icon that moves on the UI in response to an operation of the pointing device.

7. The control apparatus according to claim 6, wherein the display unit is configured to display the AF frame selected by the icon in a bold frame.

8. The control apparatus according to claim 1, wherein the display unit is configured to display the image captured by the sub camera and the UI side-by-side.

9. The control apparatus according to claim 1, wherein the display unit is configured to display the image captured by the sub camera and the UI in a superimposing manner.

10. The control apparatus according to claim 1, further comprising:
a computer memory storing holding data that holds information indicating a region, which serves as indexes representing an optical range in the optical finder of the main camera of the camera system,
a control unit configured to generate the UI having the plurality of AF frames whose position and size are the same as those of the AF frames in the displayed image captured by the sub camera, based on a difference between the region that serves as the indexes held in the holding unit and a region of the indexes in the displayed image captured by the sub camera,
wherein the control unit is implemented by a one or more processor.

11. A method of controlling a control apparatus including a communication interface that communicates with a camera system including a main camera and a sub camera, where the main camera has an optical finder in which a plurality of AF frames are superimposed on a scene and the sub camera captures an image displayed in the optical finder of the main camera, the method comprising:
receiving, from the camera system via the communication interface, an image captured by the sub camera of the camera system, where the received image includes the plurality of AF frames;
displaying the received image and a UI (user interface) for selecting at least one AF frame from the plurality of AF frames which are superimposed on the scene within the optical finder of the main camera; and
transmitting, to the camera system via the communication interface, information for specifying the at least one AF frame selected via the UI so that the main camera of the camera system selects corresponding at least one AF frame among the plurality of AF frames.

12. A non-transitory storage medium that stores a program causing a computer to execute the steps of a method of controlling a control apparatus including a communication interface that communicates with a camera system including a main camera and a sub camera, where the main camera has an optical finder in which a plurality of AF frames are superimposed on a scene and the sub camera captures an image displayed in the optical finder of the main camera, the method comprising:
receiving, from the camera system via the communication interface, an image captured obtained by the sub camera of the camera system, where the received image includes the plurality of AF frames;
displaying the received image and a UI (user interface) for selecting at least one AF frame from the plurality of AF frames which are superimposed on the scene within the the optical finder of the main camera; and
transmitting, to the camera system via the communication interface, information for specifying the at least one AF frame selected via the UI so that the main camera of the camera system selects corresponding at least one AF frame among the plurality of AF frames.

* * * * *